United States Patent [19]

Damerau

[11] 4,394,272
[45] Jul. 19, 1983

[54] LIQUID CLARIFIER AND METHOD
[75] Inventor: Herbert R. Damerau, Farmington Hills, Mich.
[73] Assignee: Pecor Corporation, Taylor, Mich.
[21] Appl. No.: 207,214
[22] Filed: Nov. 17, 1980
[51] Int. Cl.³ .......................................... B01D 29/38
[52] U.S. Cl. .................................. 210/779; 210/791; 210/107; 210/298; 210/408
[58] Field of Search ........ 210/779, 791, 804, 106-108, 210/262, 298, 408, 411, 413, 526

[56] References Cited

U.S. PATENT DOCUMENTS

| | | | |
|---|---|---|---|
| 513,123 | 1/1894 | Marmon | 209/13 R |
| 519,958 | 5/1894 | Hueffner et al. | 209/137 |
| 1,693,754 | 12/1928 | Henry | 55/297 |
| 1,720,702 | 7/1929 | Streun | 55/290 |
| 1,881,270 | 11/1930 | Evers et al. | 210/159 |
| 2,128,349 | 8/1938 | Briggs | 210/176 |
| 2,585,440 | 2/1952 | Collins | 261/111 |
| 2,736,390 | 2/1956 | Wickland | 183/22 |
| 2,861,688 | 11/1958 | Harms | 210/73 |
| 2,865,509 | 12/1958 | Harlan | 210/526 X |
| 2,877,901 | 3/1959 | Maus | 210/298 X |
| 2,887,228 | 5/1959 | Harlan et al. | 210/298 X |
| 2,999,597 | 9/1961 | Harms | 210/526 X |
| 3,087,620 | 4/1963 | Hirs | 210/111 |
| 3,194,399 | 7/1965 | Harms | 210/413 X |
| 3,221,885 | 12/1965 | Hirs | 210/298 |
| 3,305,094 | 2/1967 | Casson | 210/108 |
| 3,332,553 | 7/1967 | Casson | 210/103 |
| 3,332,556 | 7/1967 | Hirs | 210/406 |
| 3,334,749 | 8/1967 | Ladd | 210/298 X |
| 3,512,644 | 5/1970 | Nash | 210/108 |
| 3,567,024 | 3/1971 | McCormick | 210/164 |
| 3,748,835 | 2/1972 | Panzica | 55/228 |
| 3,948,773 | 4/1976 | Tucker | 210/108 |
| 4,071,451 | 1/1978 | Wood | 210/79 |
| 4,201,675 | 5/1980 | Damerau | 210/387 |
| 4,220,539 | 9/1980 | Lee | 210/401 |

Primary Examiner—Thomas G. Wyse
Attorney, Agent, or Firm—Burton, Parker & Schramm

[57] ABSTRACT

Method and apparatus for clarifying liquids wherein a flight conveyor in the settling tank has a forwarding run for removing sludge from the bottom of the tank and a return run which is selectively moved into and out of wiping cooperation with a filter between the settling tank and a clean-liquid tank, and a filter backwasher in the clean tank is selectively operable to progressively backwash the filter, and both the wiping and backwashing being accomplished in accordance with the clogged condition of the filter.

17 Claims, 11 Drawing Figures

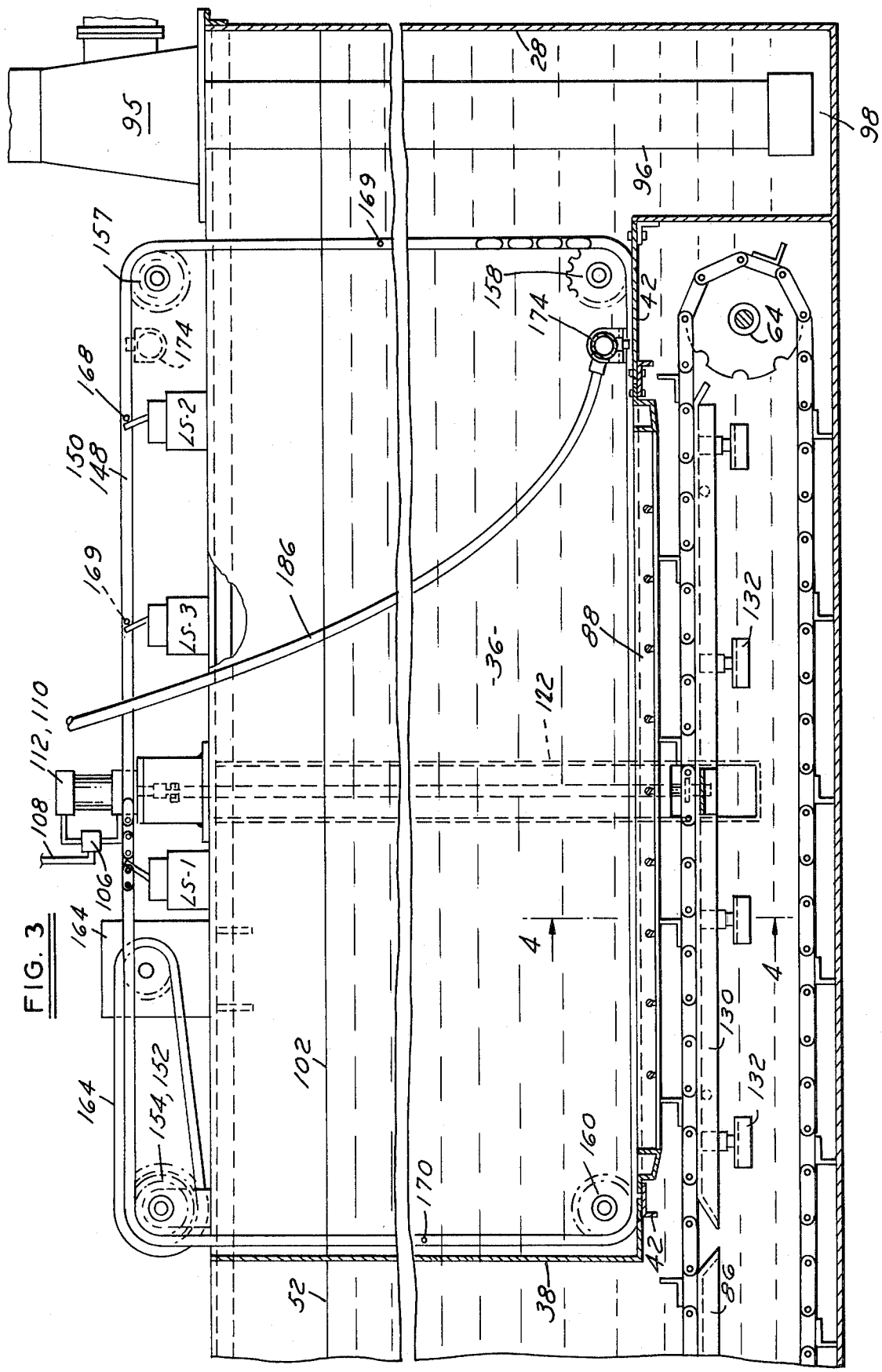

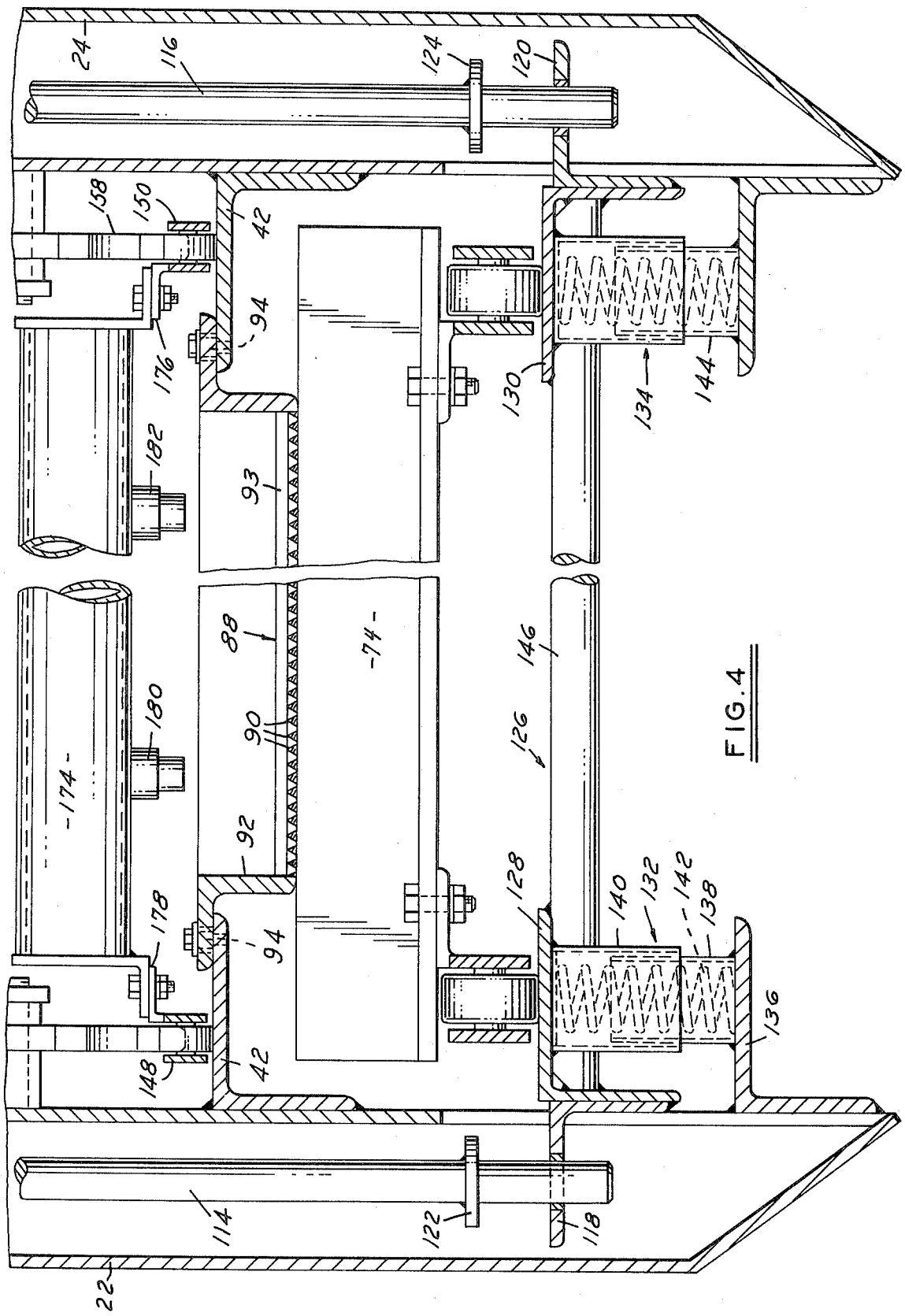

LIQUID CLARIFIER AND METHOD

FIELD OF INVENTION

This invention relates to liquid purification or clarification, and more particularly to separating or removing solid particles dispersed or suspended in liquids such as the cuttings or swarf from automatic cutting or grinding machines, and is particularly concerned with the clarification of cooling liquids or lubricants used in such machines.

BACKGROUND OF THE INVENTION

It is a common practice to employ filtration systems in connection with metal machining operations using liquid coolants and lubricants. As the liquid carries away metal chips, turnings, and other material from the work areas, it must be clarified before being again pumped through the system or discharged to the sewer. A conventional form of apparatus used in such filtering processes comprises a settling tank and a clean-liquid tank with a filter screen separating the tanks and through which the liquid to be clarified is caused to pass. The filtration efficiency increases as small contaminants build up on the screen to form a bed on the surface thereof, since these contaminants also serve to block the flow of other solid materials in the liquid. However, as the efficiency increases with the progressive clogging of the filter, the rate of flow of liquid from the settling tank to the clean-liquid tank decreases and, if permitted to progressively decrease, would eventually approach zero.

It is common practice to provide a flight conveyor having transverse flights which scrape the bottom of the settling tank and remove the sludge through a discharge chute. Heretofore apparatus has been constructed wherein a return run of the flight conveyor is used to scrape the bed or cake forming on the surface of the filter to thereby prevent an undue build-up. Such a clarifying apparatus has been in use for several years at the Oldsmobile Division of General Motors Corporation in Lansing, Mich. Also, in U.S. Pat. No. 3,748,835 there is disclosed a filter having a downwardly opening face which is scraped by the return run of a flight conveyor.

One of the difficulties with these prior art arrangements is that it is necessary to index the flight conveyor if there is a large chip or swarf load in the settling tank and this in turn will cause the return run of the flight conveyor to scrape the filter cake on the septum even though it may not be desirable to scrape the cake. Another disadvantage of such prior art arrangements is that the septum or filter screen is not readily accessible for cleaning or replacement. In addition, if there is an unusually large chip or swarf load on the filter, it may cause the flight conveyor to jam, requiring an expense and time consuming shut-down of the clarifier.

SUMMARY OF THE INVENTION

I have discovered that a clarifier may be provided which, unlike other permanent screen clarifiers, need not have the filter cake indexed simply because of a large chip load in the settling tanks, and the downstream side of the filter septum may be fully exposed for easy access. My clarifier utilizes a septum wiper that wipes only when needed. The clarifier also is provided with a backwasher which allows the device to clarify high capacities per square foot of screen area. For example, a single system may be provided with a flow rate of up to 12000 gallons per minute or more and settling tank volume screen area sizes and filter slot openings of from 0.002 to 0.075 inches may be utilized to suit particular applications.

In my improved clarifier the return of the flight conveyor is arranged adjacent the filter and is yieldingly biased against or toward the filter. If an obstruction, such as a chip, sludge, etc., occurs on the surface of the filter which would tend to jam the conveyor, the conveyor will deflect away from the filter to automatically accommodate this condition without stopping the mechanism.

Operation of the filter wiper and the backwasher may conveniently be under the control of a liquid level differential sensor which senses the levels in the clean-liquid tank and settling tank and when the filter becomes clogged to the point that the differential exceeds a predetermined amount, the filter wiper is activated, and if this does not sufficiently clean the filter to restore the liquid level differential to an acceptable value, then the backwasher is activated.

During either filter wiping or backwashing, the clarifier may continue to accept contaminated liquid for clarification, and continue to perform the clarification function.

The filter septum may be readily removed for maintenance or cleaning without necessitating disassembly of the flight conveyor or any substantial dismantling of other portions of the clarifier.

BRIEF DESCRIPTION OF THE DRAWINGS

FIG. 3 is an enlarged fragmentary section through the clean-liquid tank portion of the clarifier showing the return flight cooperating with the septum;

FIG. 4 is a cross-sectional view taken on a line 4—4 of FIG. 3;

BRIEF DESCRIPTION OF PREFERRED EMBODIMENT

Figure 1:
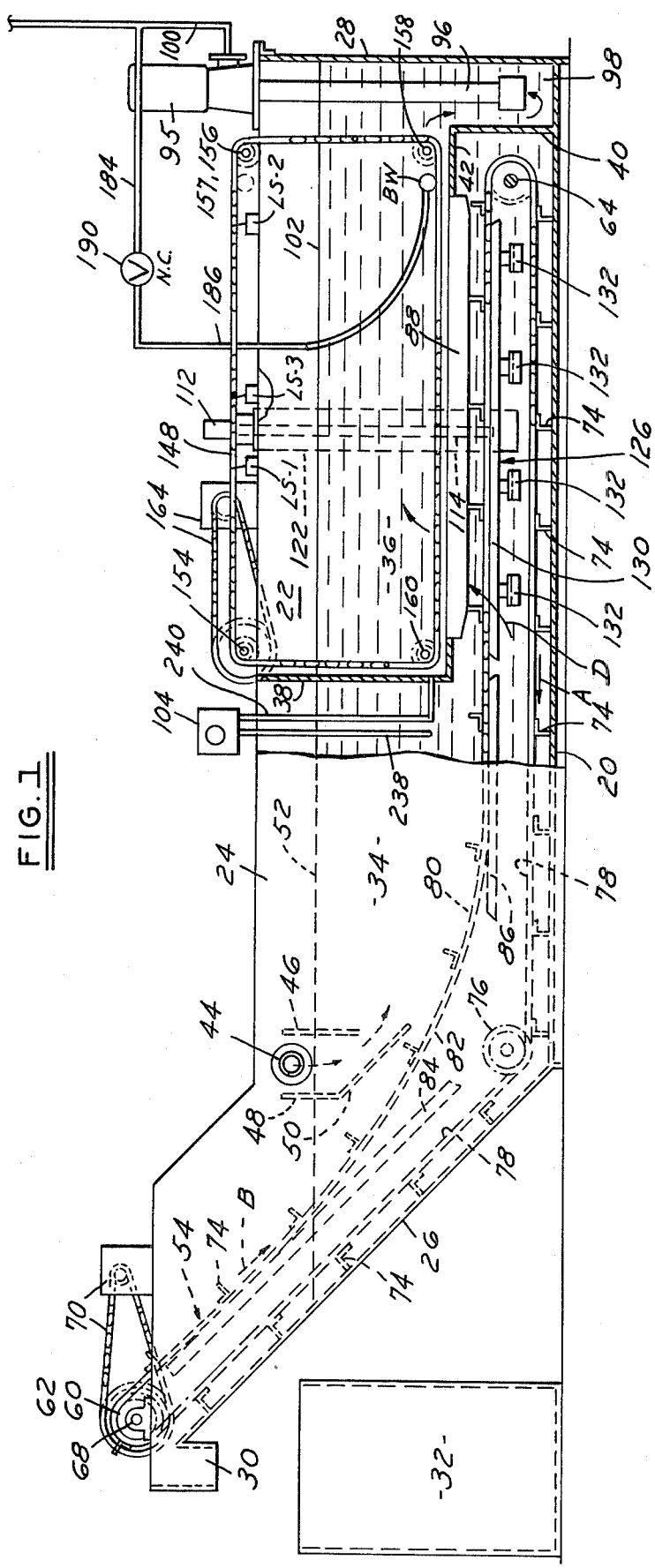
FIG. 1 is a side elevation of a clarifier embodying my invention with a portion of a side wall removed to show internal mechanism.

As shown in the various figures of the drawings, the clarifier comprises a container having a bottom wall 20, side walls 22 and 24 and end walls 26 and 28. End wall 26 slopes upwardly as best shown in FIG. 1, terminating in a sludge discharge chute 30 from which the material filtered from the coolant and lubricating fluid is discharged to a suitable receptacle 32.

The container 24 is divided into a settling tank 34 and a clean-liquid tank 36 by a partition comprising a pair of vertical portions 38 and 40 and a horizontal portion 42, all of which extend transversely between the side walls 22 and 24 with the vertical wall 38 extending downwardly from the upper edges of the side walls 22 and 24 to the horizontal portion 42 and the vertical portion 40 extending downwardly to the bottom wall 20 of the container.

Contaminated influent enters the settling tank 34 through an inlet pipe 44 connected to a source thereof, such as machine tools or the like. Its incoming velocity is broken by a baffle arrangement comprising a pair of vertical walls 46 and 48, with the latter having a downwardly angling portion 50. The baffle arrangement will deflect the influent as shown by the arrows in FIG. 1. The location of the entry pipe 44 may vary, depending upon the size of the clarifier and its intended use. The influent is intended to fill the settling tank 34 to approximately the level 52.

Large chips and sludge contained in the influent settle to the bottom 20 and are removed by a flight conveyor 54 which includes a pair of endless chains 56 and 58 entrained over drive sprockets 60 and 62 with the opposite end of the chains entrained over idler sprockets, one of which is shown at 64. Sprockets 60 and 62 are mounted on a drive shaft 68 supported in suitable bushings at the upper edges of the side walls 22 and 24. The shaft 68 is driven through a power train 70 by a suitable electric motor 72. The direction of rotation is such that the forwarding run 78 of the conveyor moves in the direction of arrow A, while the return run moves in the direction of arrow B. Extending transversely between the chains are L-shaped blades or flights 74 which, on the forwarding run 78 are disposed to scrape the bottom walls 20 and 26 of the settling tank. The flights are held against such walls by the idler sprockets 76. On the return run 80 of the drag conveyor, the chains hang in a catenary curve 82 between guides 84 and 86 which underlie the return run. The slack in the chains at the curve 82 permits a certain looseness beneath the filter which is advantageously employed as hereinafter explained.

Figure 5:
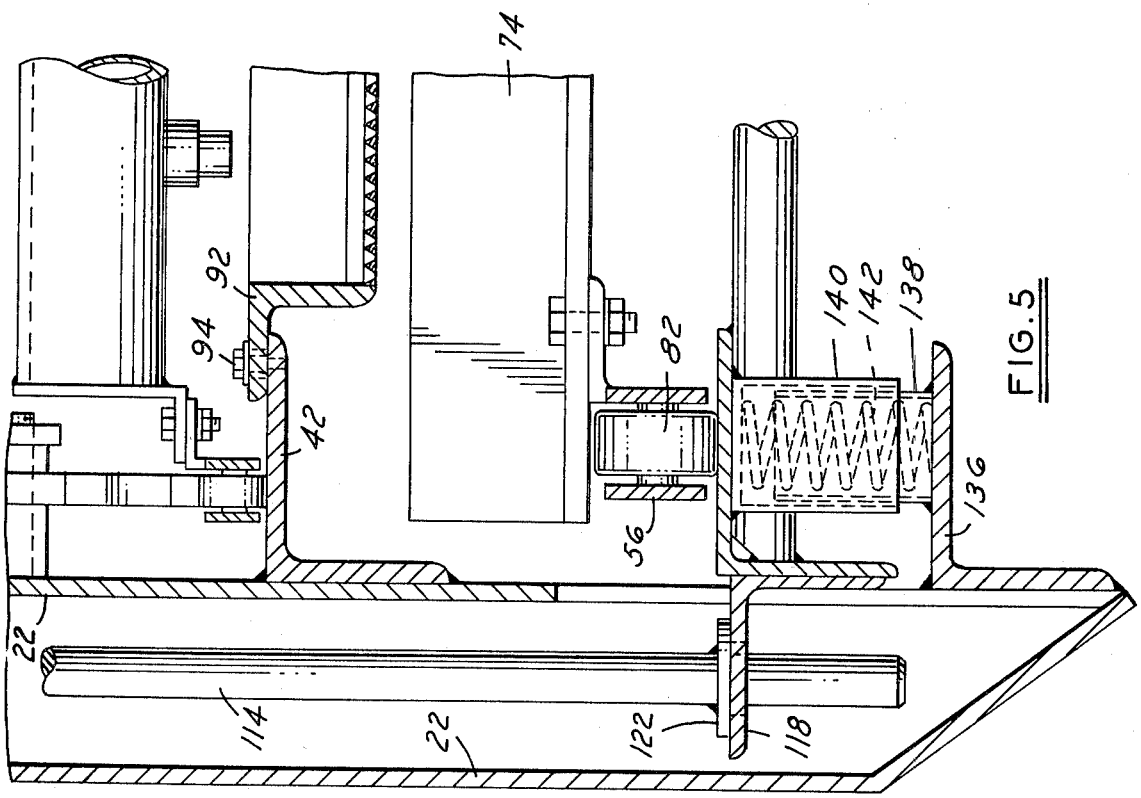
FIG. 5 is a fragmentary cross-sectional view similar to FIG. 4 but showing the flight conveyor spaced downwardly from the septum.
Figure 6:
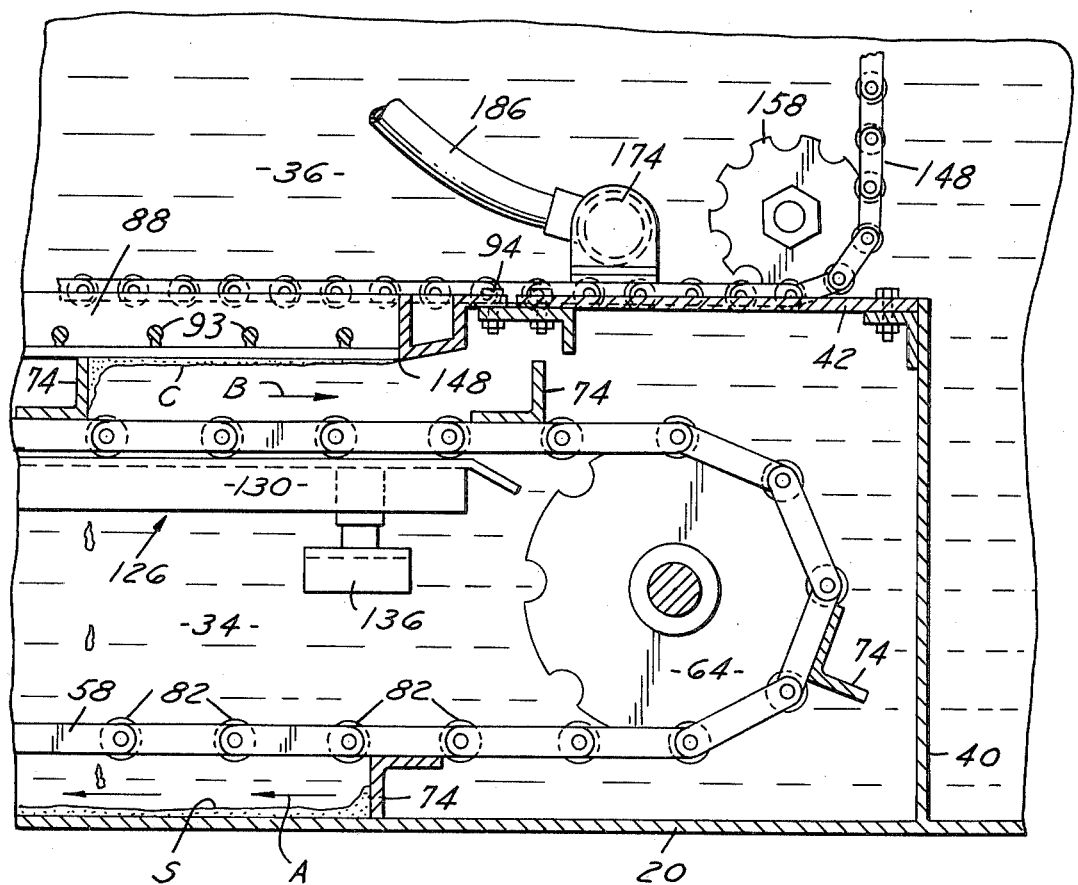
FIG. 6 is an enlarged fragmentary section through the bottom of the clean tank showing the flight conveyor and downstream side of the septum.

As shown in FIGS. 5 and 6, each of the chains 56 and 58 includes a series of rollers 82. The rollers are adapted to ride on the guides 84 and 86 to support the return run of the chain conveyor. The guides 84 and 86 may comprise L-shaped angle members secured to the side walls 22 and 24 of the tank.

The horizontal partition wall 42 between the clean-liguid tank and the settling tank defines a rectangular opening at the interface between tanks 34 and 36 within which is received a wedge wire or the like filter 88 comprising a closely spaced series of stainless steel wedgeshaped bars 90 supported in a rectangular frame 92. The bars are backed up by transverse stiffeners 93. The slots between the bars at the narrowest slot opening may be 0.002 inches to 0.075 inches and is designed to suit the particular application for which the clarifier is to be used. The frame 92 may be held by suitable fasteners 94 down against the partition wall 42 as best shown in FIG. 5.

The wedge wire filter allows contaminated influent to pass upwardly through it as shown by the arrows D in FIG. 1 to be clarified as it enters the clean tank 36. Particles larger than the slot opening of the filter are impeded, which in turn impede finer particles, thereby forming a filter cake C (see FIG. 6) on the underside of the septum. Large flows per square foot are utilized in my improved clarifier to promote rapid build-up of the cake. As the filter cake increases in depth, resistance to liquid flow through it increases. Clean liquid in tank 36 is pumped therefrom by a pump 95 whose suction line 96 extends to near the bottom of the clean tank in a well 98 formed at the righthand end of the clarifier. The clean liquid is pumped from pump 95 through line 100 for either re-circulation to the machine tools or for waste disposal.

Means are provided for sensing the decreasing porosity (i.e., clogging) of the filter, or the increasing porosity (i.e., unclogging) of the filter. As the filter cake C builds up, the resistance to flow of liquid from tank 34 to tank 36 is sufficiently impeded that the liquid level 52 in the dirty tank 34 exceeds the liquid level 102 in the clean tank. The difference in liquid levels in the tanks is sensed by a liquid level differential sensor 104 which is more particularly described hereinafter. When the liquid level differential exceeds a predetermined amount, the filter wiper 126 is activated causing the return run 80 of the flight conveyor to be raised into scraping relation with the cake C, and the cake is scraped by the conveyor thereby increasing the porosity of the filter allowing more liquid to flow therethrough. If the flow through the filter bed is sufficient, the liquid level differential between the tanks 34 and 36 will tend to be restored to within a preset range. However, if scraping of the filter cake C by the flight conveyor does not restore the liquid level differential to an acceptable value, then the backwasher BW (FIG. 1) is activated which traverses the screen 88 within the clean liquid tank 36 and sprays clean liquid under pressure against the screen to back flush through it. Such backwashing continues until the liquid level differential is restored to the design parameters.

In carrying out the foregoing operation, when differential sensor 104 determines that the liquid level differential exceeds a predetermined range, it energizes solenoid valve 106 (FIG. 3) causing air pressure to be delivered by a line 108 (connected to a source of air pressure not shown) to the lower ends of a pair of double acting air cylinders 110 and 112 mounted at the upper edge of side walls 22 and 24. The air cylinders have downwardly extending push rods 114 and 116 which extend at their lower ends through brackets 118 and 120. Each of the push rods is provided with a flange 122 and 124 adapted to bear against the brackets 118 and 120 when the cylinders are pressurized at their upper ends, thereby depressing the brackets, as shown in FIG. 5. When the cylinders are pressurized at their lower ends, as aforesaid, the push rods are raised as shown in FIG. 4.

Brackets 118 and 120 are secured to the filter wiper comprising a springloaded flight conveyor guide assembly 126, best shown in FIGS. 3, 4 and 5. The assembly includes a pair of elongated guide rails 128 and 130, each of which is supported by spring supports 132 and 134 which normally urge the rails upwardly bringing the flights 74 into cake-scraping relation with the filter cake C formed on the underside of the septum as shown in FIG. 6. Each of the springloaded assemblies includes a mounting bracket 136 secured to the side of the tank. A pair of interfitting sleeves 138 and 140 are secured respectively to the bracket 136 and the guide rail 128, and a coil spring 142 is disposed within the sleeves to bear against the bracket 136 and the guide rails 128 and 130. The telescoped sleeves serve to stabilize the rails against lateral displacement while guiding them for vertical movement. Transverse members 146 are secured at opposite ends to the rails 128 and 130. The brackets 118 and 120 are secured to the rails 128 and 130.

Upon pressurizing the upper ends of air cylinders 110 and 112, the push rods 114 and 116 are moved downwardly to bring the flanges 122 and 124 against the brackets 118 and 120, thus pressing the conveyor rails 128 and 130 downwardly against the tension of the coil springs 142 and 144 and lowering the rails and allowing the conveyor flights 74 to drop by gravity downwardly away from the septum. Conversely, upon reverse pressurization of the air cylinders, the springs 142 and 144 will cause the rails to rise, moving the flights 74 into contact with the settling tank side of the filter so that the flights 74 will engage the filter cake C. The spring force of the coil springs 142 and 144 maintains a constant contact between the conveyor flight and the filter screen when in the position shown in FIG. 4. As the conveyor flights scrape the screen on the return run, the cake C, shown in FIG. 6, is moved along the screen. The conglomerated portion of the cake which reaches the righthand end of 148 of the screen will fall by gravity to the bottom of the tank 34 and be removed therefrom by the flight conveyor on its forward run.

The movement of the filter cake under the influence of the transverse flights of the drag conveyor promotes porosity of the filter, thereby reducing resistance to flow and thus reducing the liquid level differential between the tanks. At a predetermined differential setting, the liquid level differential switch 104 will de-energize the solenoid valve 106, causing the air cylinders 110 and 112 to be reversely pressurized, thereby urging the push rods downwardly, bringing the flanges against the brackets 118 and 120 to move the rails 128 and 130 downwardly, in turn moving the return run of the drag conveyor away from the septum of the filter. The flight conveyor will then operate out of contact with the filter cake simply serving to drag sludge, chips and other matter in the bottom of the settling tank to the chute 30 for discharge from the clarifier.

Figure 2:
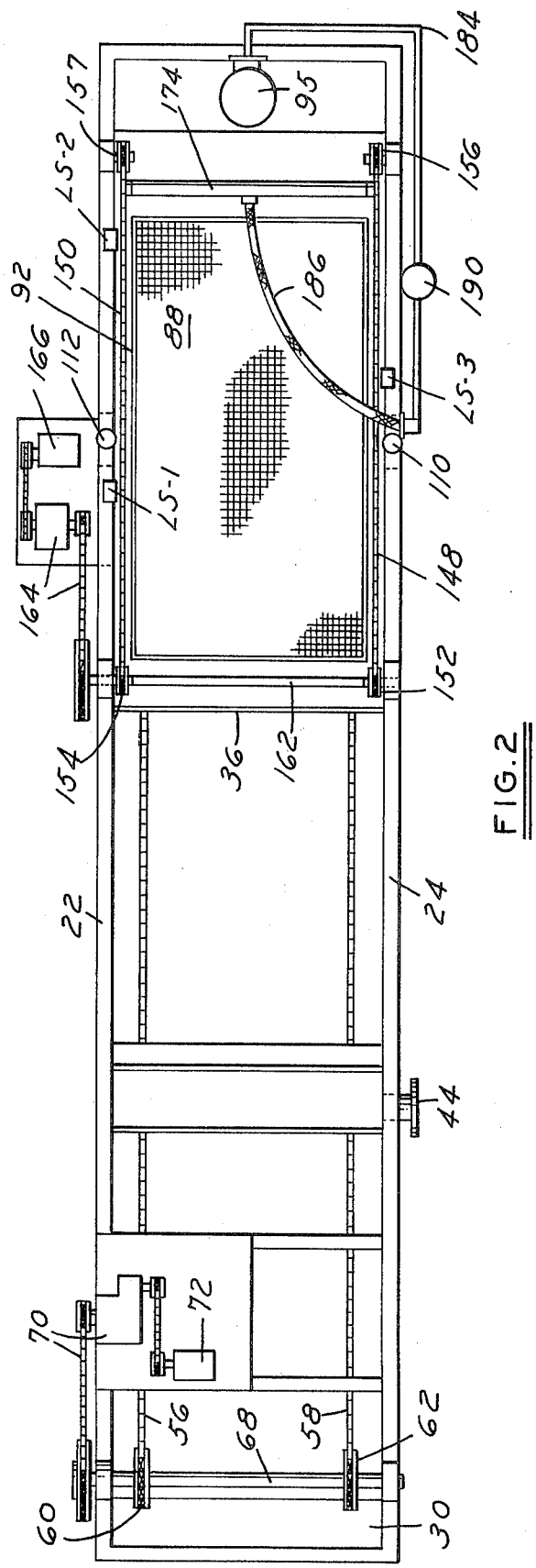
FIG. 2 is a plan view of the clarifier of FIG. 1.
Figure 8A:
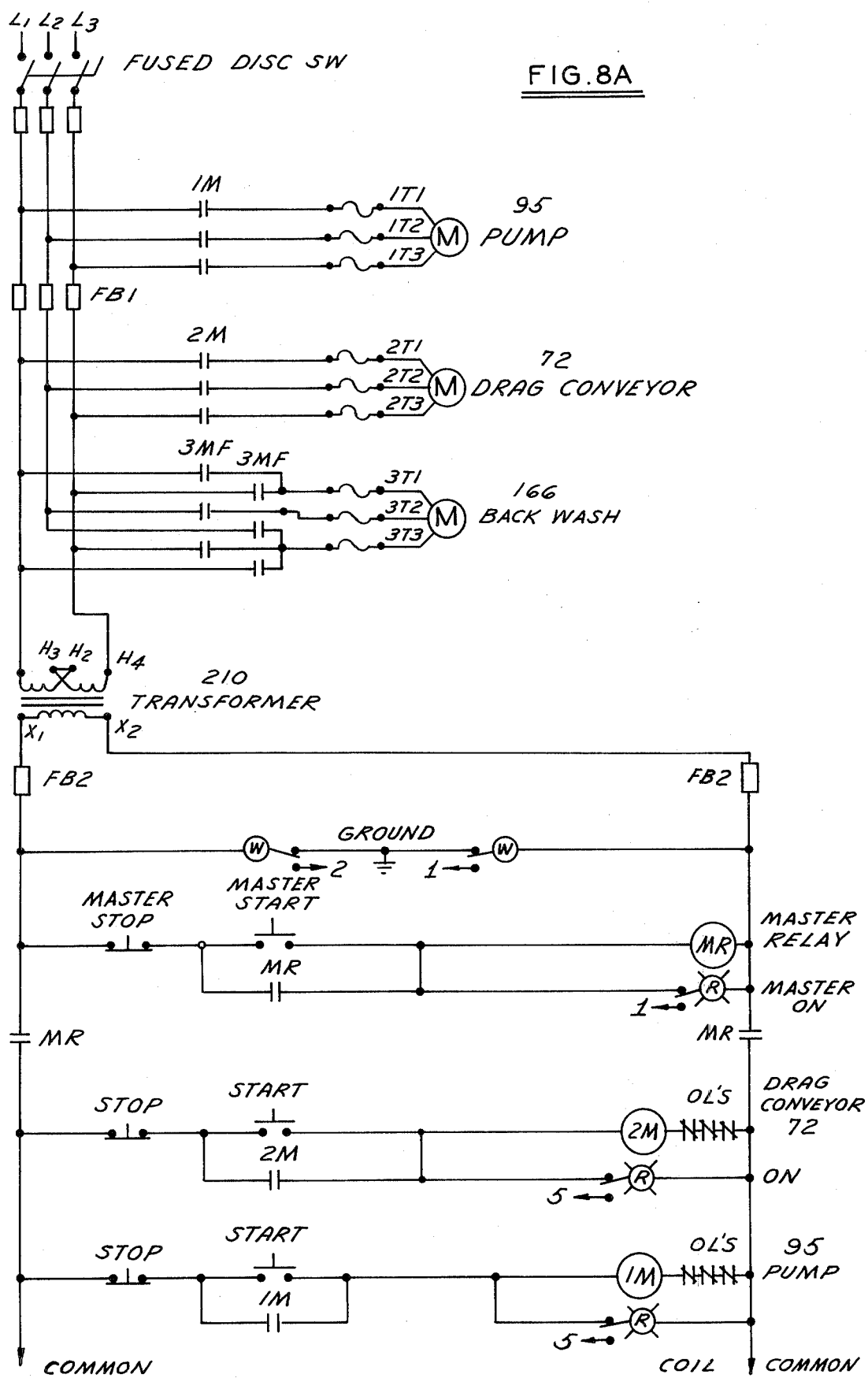
FIGS. 8A and 8B show a schematic control circuit for my clarifier.

If the foregoing filter cleaning sequence does not reduce the liquid level differential between the settling tank 34 and clean-liquid tank 36 the control system will energize the backwash mechanism BW above mentioned which will cause a backwashing of the filter septum. The backwash mechanism includes a pair of endless chains 148 and 150 entrained over drive sprockets 152 and 54 and idler sprockets 156, 157, 158 and 160, shown in FIGS. 2 and 3. The sprockets 152 and 154 are mounted on a shaft 162 driven by a power transmission 164 which is powered by a reversible electric motor 166 (FIGS. 3 and 8A). The chain 150 carries a pair of stops 168 and 170 and chain 148 carries a stop 169 adapted to cooperate with limit switches LS1, LS2 and LS3 to trip the same on approach of the stops. Such switches control operation of electric motor 166 and related devices as hereinafter more fully explained.

Extending transversely of, and mounted on, the chains 148 and 150, is a backwash header 174. The header comprises a cylindrical pipe closed at opposite ends by end plates which are in turn secured by brackets 176 and 178 to the chains. A series of spray nozzles 180 and 182 communicate with the interior of the header and are directed downwardly to spray onto the top of the filter septum. The pump 95 is connected to the backwash header by a pipe 184 and a flexible hose 186.

A normally closed solenoid valve 190 upon being energized is opened to cause discharge from the pump 95 to the header 174 and clean liquid is sprayed from the discharge nozzles. At the same time that the valve 190 is opened, the backwasher motor 166 is energized to cause the chains 148 and 150 to be traversed, moving the header 174 in a forward direction (toward the lefthand side of the septum as viewed in FIGS. 1 and 2), thereby effecting a backwashing of the filter. Flow through the septum indicated by the arrow D from the settling tank to the clean tank continues during the backwashing operation except in the immediate area of the backwashing. Similarly, the flight conveyor may also be moving the cake along the bottom of the septum. The backwashing will continue until the liquid level sensor 104 indicates that the liquid differential is restored to an acceptable value, and at that time, the motor 166 and valve 190 will be de-energized and the backwashing will be interrupted.

As will be noted from FIG. 3, the at-rest position of the backwash header is away from the filter screen 88, thereby allowing the screen to be readily removed for servicing, should such be desired. In addition, by manually overriding the control system, motor 166 may be operated to carry the backwash header 174 to the top of the apparatus for servicing of the spray nozzles.

Figure 7:
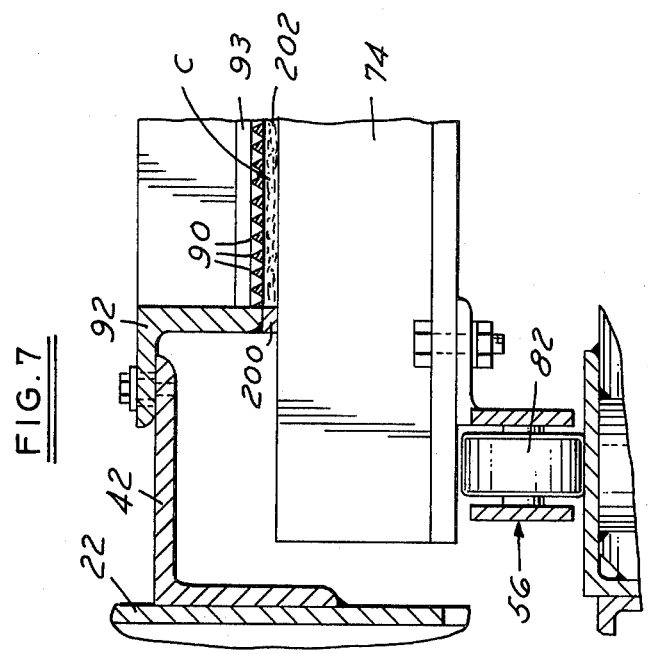
FIG. 7 is an enlarged fragmentary cross-sectional view similar to FIG. 5 but showing a wear spacer on the filter.

In some instances it may be desirable to not wipe the filter septum completely clean, but rather to remove only a portion of the filter cake. This is accomplished by the modification shown in FIG. 7, where wear strips 200 are secured to the frame 92 of the wedge wire filter. The wear strips serve to space the transverse flights 74 downwardly from the surface of the wedge wire filter to provide a space 202 as shown in FIG. 7. The filter cake C may thus be provided in a controlled depth, and when it exceeds this amount, the flights 74 will serve to scrape it when they are permitted to come into contact with the wear strips 200 as a result of the de-pressurization of the air cylinders 110 and 112.

Because of the construction herein shown, wedge wire screen panels with different slot characteristics can be readily interchanged to suit changing system requirements simply by removing the fasteners 94 and lifting out the screen sections and replacing them.

Figure 8B:
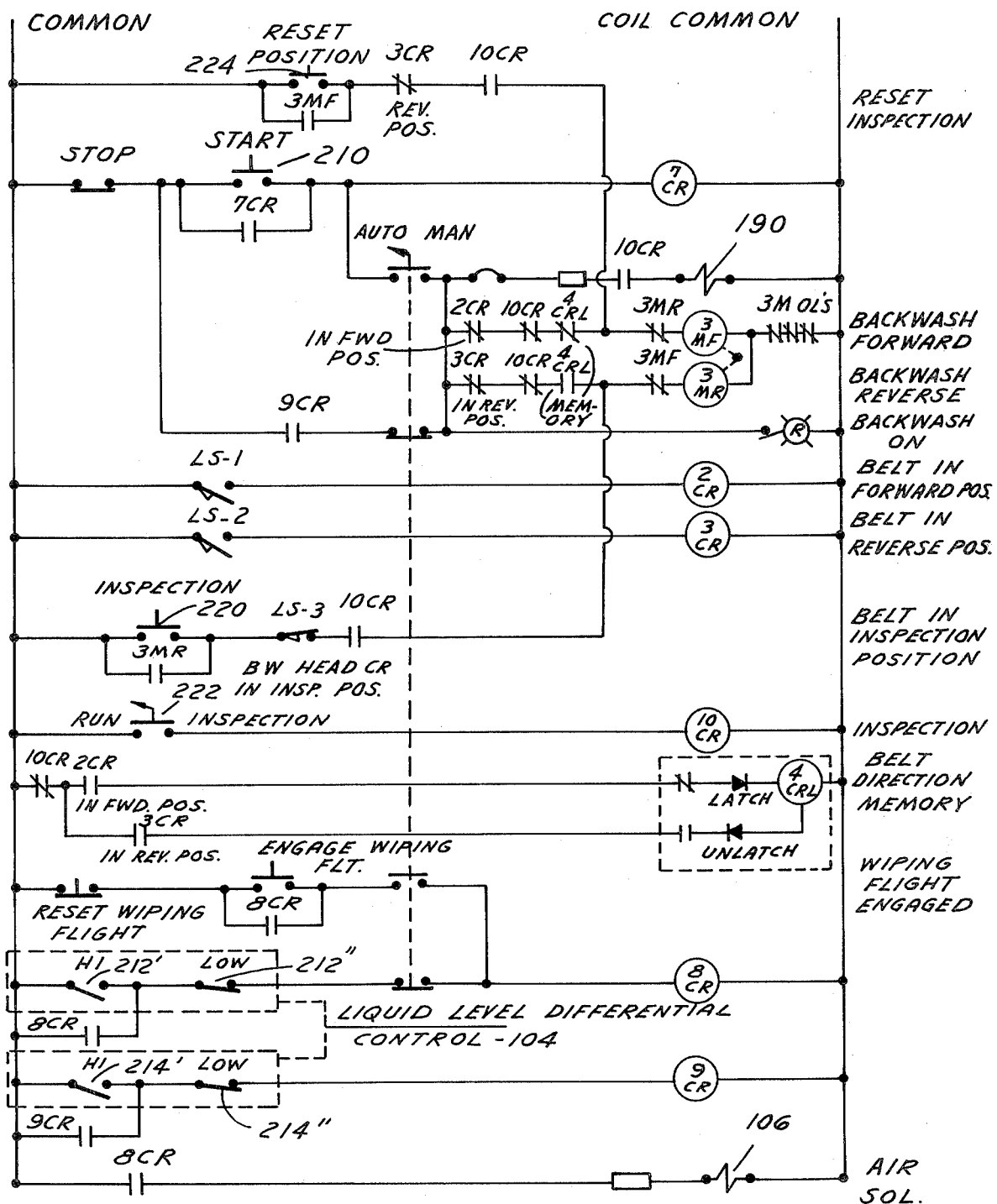

Control of the operation is accomplished by a control system shown schematically in FIGS. 8A and 8B which depict a three phase 440 volt power source at L1, L2 and L3 supplying pump 95, flight conveyor motor 72 and backwasher motor 166 and then through a transformer 210, a 110 volt control circuit. The circuit diagram of FIGS. 8A and 8B utilizes conventional symbols and with the following brief description it is thought those skilled in the art will readily understand the functional arrangement. With the master control circuit switch on, and the drag conveyor motor start switch on, motor control 2M is energized starting motor 72. Similarly, start switch for pump 95 is closed to start the pump motor. With these devices operating and dirty liquid being delivered to the settling tank as aforesaid, start switch 210 is closed energizing relay 7CR to set up the liquid level sensor circuit controlling 8CR and 9CR.

With the circuit of FIG. 8B set on "auto", when the differential sensor 104 determines that the liquid level differential between tanks 34 and 36 exceeds a preset range, the high level switch 212' is closed energizing relay 8CR and in turn energizing solenoid valve 106 causing air to be delivered to the lower ends of cylinders 110 and 112 as aforesaid. This will cause the flight conveyor return run to scrape cake C and if such scraping suffices to open the filter sufficiently that the flow D is increased in an amount that restores the liquid level differential to the preset range, then the low level switch 212" is opened which will in turn de-energize solenoid valve 106 causing the upper ends of the air cylinders 110 and 112 to be pressurized and the lower ends vented to the atmosphere, and the push rods 114 and 116 are moved down thereby lowering the flight conveyor from the filter to stop scraping of the cake.

If operation of the flight conveyor in the filter scraping mode is insufficient to open the filter porosity enough to cause return of the liquid level differential to the preestablished range, and the liquid level differential continues to increase, a second high differential switch 214' closes thus energizing relay 9CR which in turn energizes backwash solenoid valve 190 and motor control 3MF which causes pump 95 to deliver backwashing liquid to the spray nozzles on header 174 and also causes motor 166 to be energized to move the header from the position shown in FIG. 3 toward the left. As soon as the backwashing is sufficient to open the porosity of the filter and cause a reduction in liquid level differential to the acceptable range, the low level switch 214" will open, stopping traverse of the backwash header and also closing valve 190 to stop the delivery of liquid to the header.

If during backwashing the header traverses to the left-hand end of the septum as viewed in FIG. 3, stop 170 will engage LS-1 which will energize relay 2CR and in turn reverse the direction of the motor 166. When the backwash header reaches the righthand end of the filter, stop 168 will engage LS-2 thereupon again reversing motor 166.

Should it be desired to inspect the spray nozzles 180 and 182 for proper operation, the apparatus has an override inspection switch having contacts 220 and 222, and upon closing same the motor 166 is operated to move the header up to the top of the clean tank to the phantom outline position shown in FIG. 3, in which position a stop 169 will trip limit switch LS-3 opening same and stopping motor 166. At completion of inspection, the reset position switch 224 is closed which reversely operates motor 166 to return the backwash header to the solid outline position shown in FIG. 3.

There are various other switches and relays shown in FIGS. 8A and 8B to enable various non-automatic functions or to carry out the automatic functions above described and it is believed that the operation of such will be apparent to those skilled in the art and need not be further described.

Figure 9:
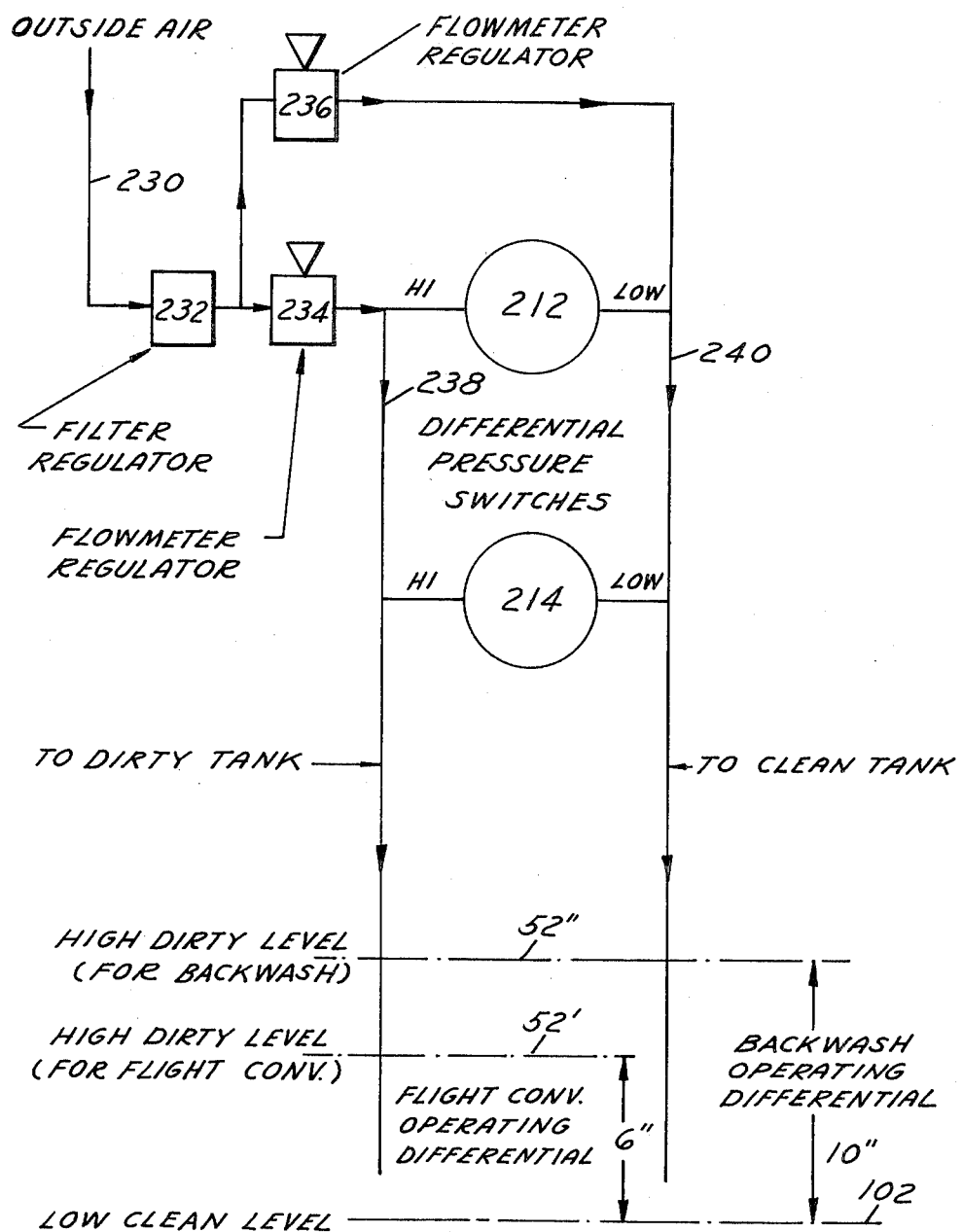
FIG. 9 is a schematic diagram of the liquid level differential sensor useable with the control circuit of FIGS. 8A and 8B, and following a modification useable with the circuit of FIG. 8C.

In FIG. 9, I have shown a differential sensor of a type that may be used as the sensor 104 heretofore described. It may be used with the control system of FIGS. 8A and 8B. The differential liquid level sensor 104 comprises a pair of differential pressure switches 212 and 214. These switches may be PHOTOHELIC® pressure differential switches manufactured by Dwyer Instruments, Inc. of Michigan City, Ind., Model 3060. I have shown them schematically in FIG. 9. Each includes "high level" and "low level" contacts 212' and 212" and 214' and 214", respectively, which operate as shown and described in FIG. 8B. These switches are connected to a source of air pressure (not shown) delivered through a line 230 and through a pressure filter regulator 232, and from thence to a pair of flowmeter/constant pressure regulators 234 and 236, such as Dwyer Model VFA VISIFLOAT flowmeter/regulators which provide a constant air flow at a preset pressure. The air from flowmeter/regulators is bubbled into the settling tank 34 and clean tank 36 by the lines 238 and 240. The Dwyer switches 212 and 214 are connected in parallel between the lines 238 and 240 and sense the backpressure therein which varies as a function of the liquid levels.

I have also shown in FIG. 9 the liquid levels of the tanks. For example, the operating liquid level differential between the clean tank 36 and the dirty or settling tank 34 might be six inches as represented by the levels 102' and 52'. Within this range the clarifier operates without energizing either the filter scraper or backwasher. However, if the differential exceeds six inches, then the flight conveyor scraper solenoid 106 is energized and the conveyor guide assembly 126 raises the return run bringing the flights 74 into scraping relation with cake C. If this is insufficient to reduce the liquid level differential to within the six inch range and it continues to increase, when it reaches, for example ten inches, as indicated at 52', switch contacts 214' in the differential pressure switch 214 are closed in turn starting the backwash operation. When the differential is reduced to ten inches, the low level contacts 214" open and the backwash stops. When the differential drops to within the six inch range, the contacts 212" open and the return flight is shifted downwardly away from the septum and scraping of the cake is discontinued.

Figure 8C:
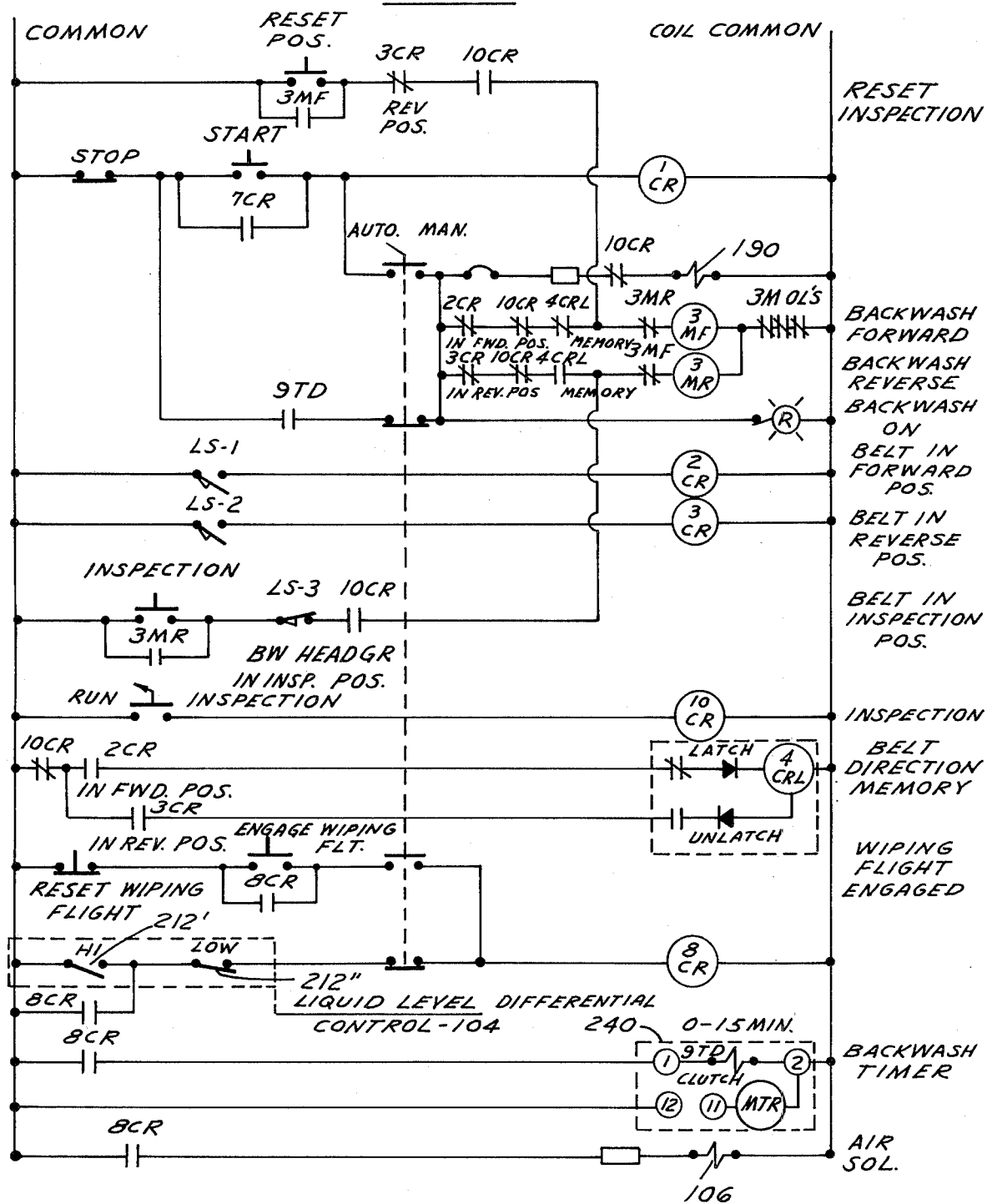
FIG. 8C shows a modified form of the control circuit of FIG. 8B.

In lieu of controlling operation of the backwasher by the differential sensor 214, it may be operated by a timer as shown in FIG. 8C. In this modification FIG. 8C would be substituted for FIG. 8B and 214 in FIG. 9 would be omitted. In operation, when the liquid level differential exceeds, for example, six inches, contacts 212' are closed energizing the cake scraping operation by the flight conveyor against the filter septum. This also energizes a timer 240 which may be set for say a two minute interval. If during such interval the liquid level differential does not drop back to the six inch range as a result of the scraping by the flight conveyor, the timer times out and 9TD is closed energizing the backwash valve 190 and motor 166. The backwasher then continues to operate until the liquid level differential drops to within the six inch range and then the contacts 212" open, thereby opening relay contacts 8CR and stopping the backwasher and the cake scraping by the flight conveyor.

Thus it will be noted from the foregoing description of the control system for my clarifier that the means which is responsive to the clogging of the filter to start the scraping of the filter cake and the backwashing may comprise a liquid level differential sensor, such as the sensor 104, which senses the liquid levels in tanks 34 and 36. The sensor may, as described in connection with the circuits of FIGS. 8A, 8B and 9, have a first high level setting (or differential value) which, when reached by the liquid level in the settling tank 34 exceeding the level in the clean tank 36 by such set amount, causes operation of the filter wiper 126 to bring the flight conveyor into scraping relation with the cake. If this does not serve to open the porosity of the filter sufficiently to cause a reduction in the liquid level differential in the tanks, there is a second higher differential setting provided by contacts 214' and when the liquid level in tank 34 exceeds the level in tank 36 by this further setting, the contacts are closed initiating operation of the backwasher. When the differential in liquid level falls to the settings of contacts 214" and 212", the backwash and scraping of the filter is discontinued. The differential switches may be adjusted to vary the high and low settings to suit the particular needs of the clarifying operation being handled.

Similarly, in the control circuit of FIG. 8C, the timer for initiating operation of the backwasher may be adjusted to commence backwashing at such period of time after the high setting of contacts 212' have been reached (and before contacts 212" have opened) as suits the particular application of the clarifier.

I claim:

1. A liquid clarifier comprising, in combination:
   a settling tank;
   a clean-liquid tank;
   a filter between the tanks through which liquid flows from the settling to the clean-liquid tank;
   a flight conveyor in the settling tank having a forwarding run arranged to scrape the bottom of the settling tank and move sludge to a discharge chute and a return run arranged adjacent the filter; and
   means for selectively positioning the conveyor return run either close to the filter to scrape a filter cake formed thereon or position the return run in spaced non-scraping relation.

2. The invention defined by claim 1 wherein the clean-liquid tank is above at least a portion of the settling tank and the filter is disposed at the interface between the tanks.

3. The invention defined by claim 2 wherein the filter is disposed substantially horizontally and the liquid flow is upwardly through the filter and the return run of the conveyor is disposed below the filter and moved upwardly theretoward to scrape the filter cake or downwardly away from it to non-scraping position.

4. The invention defined by claim 1 wherein means are provided responsive to clogging of the filter and operable to cause the first mentioned means to move the return run into cake scraping relation with the filter.

5. The invention defined by claim 4 wherein said means responsive to clogging of the filter is also responsive to increasing porosity of the filter to cause the first mentioned means to move the return run away from the filter.

6. The invention defined by claim 1 wherein said means includes resiliently supported conveyor guides cooperating with the conveyor to urge the conveyor return run into filter-cake-scraping relation with the filter.

7. The invention defined by claim 6 wherein said means also includes selectively operable apparatus for shifting the conveyor guides away from the filter.

8. A liquid clarifier comprising, in combination:
   a settling tank;
   a clean-liquid tank;
   a filter between the tanks through which liquid flows from the settling to the clean-liquid tank;
   a flight conveyor in the settling tank having a forwarding run arranged to scrape the bottom of the settling tank and move sludge to a discharge chute and a return run arranged adjacent the filter;
   conveyor guide means for selectively positioning the conveyor return run close to the filter to scrape a filter cake formed thereon or position the return run in spaced non-scraping relation with the filter cake; and
   means for sensing clogging of the filter and connected to said conveyor guide means to cause the guide means to position the conveyor return run in filter-cake-scraping relation when the clogging reaches a predetermined amount and cause the guide means to position the return run away from the filter cake when the clogging is reduced.

9. The invention defined by claim 8 wherein said sensing means comprises a liquid level differential sensor for sensing the liquid levels in the settling tank and clean-liquid tank and operable to initiate filter-cake-scraping when the differential reaches a determined amount.

10. A liquid clarifier comprising, in combination:
    a settling tank;
    a clean-liquid tank;
    a filter between the tanks through which liquid flow from the settling to the clean-liquid tank;
    a flight conveyor in the settling tank having a forwarding run arranged to scrape the bottom of the settling tank and move sludge to a discharge chute and a return run arranged adjacent the filter;
    conveyor guide means arranged to position the return run of the flight conveyor either close to the filter to scrape a filter cake formed thereon or spaced from the filter in a non-scraping position;
    filter backwash apparatus connected to a source of liquid under pressure and including nozzle means supported adjacent the filter on the clean tank side thereof for backwashing through the filter toward the settling tank side; and
    means responsive to the clogging and unclogging of the filter and connected to the conveyor guide means and to the backwash apparatus to operate the same in response to the condition of the filter.

11. The invention defined by claim 10 wherein the means responsive to the clogging and unclogging of the filter comprises liquid level differential sensing apparatus connected to the settling tank and clean-liquid tank.

12. The invention defined by claim 11 wherein said differential sensing apparatus includes a control circuit connected to the conveyor guide means for causing positioning of the return flight in cake scraping or non-scraping positions in accordance with whether the liquid level differential exceeds or not a first differential value, and said differential sensing apparatus includes a second control circuit connected to the backwash apparatus for operating the same in accordance with whether the liquid level differential exceeds or not a second differential value.

13. The method of clarifying a liquid comprising:
    delivering the liquid to a settling tank;
    holding the liquid in the tank to allow contaminates to settle therefrom;
    removing sludge from the tank by arranging a flight conveyor so that a forwarding run scrapes the bottom of the tank;
    moving liquid in the settling tank through a filter into a clean tank;
    shifting the return run of the flight conveyor into and out of scraping relation with the filter in accordance with the clogged condition thereof; and
    selectively backwashing through the filter with liquid in the clean tank.

14. The invention defined by claim 13 wherein the backwashing is carried out by directing a backwashing spray only at a portion of the filter and moving the spray across the filter to progressively backwash it.

15. A liquid clarifier comprising, in combination:
    a settling tank;

a clean-liquid tank;

a filter between the tanks through which liquid flows from the settling to the clean-liquid tank;

a flight conveyor in the settling tank having a forwarding run arranged to scrape the bottom of the settling tank and move sludge to a discharge chute and a return run arranged adjacent the filter;

conveyor guide means arranged to position the return run of the flight conveyor to scrape a filter cake formed on the filter;

filter backwash apparatus connected to a source of liquid under pressure and including nozzle means supported adjacent the filter on the clean tank side thereof for backwashing through the filter toward the settling tank side;

said conveyor guide means being shiftable to move the return run of the flight conveyor away from the filter to a non-scraping position; and control means coupled to the conveyor guide means and to the filter backwash apparatus for selectively operating them in accordance with the clogged condition of the filter.

16. The invention defined by claim 15 wherein said control means includes a liquid level differential sensor responsive to the liquid level differential in the tanks.

17. The method of clarifying a liquid comprising:

delivering the liquid to a settling tank;

holding the liquid in the tank to allow contaminates to settle therefrom;

removing sludge from the tank by arranging a flight conveyor so that a forwarding run scrapes the bottom of the tank;

moving liquid in the settling tank through a filter into a clean tank; and shifting the return run of the flight conveyor into and out of scraping relation with the filter in accordance with the clogged condition thereof.

* * * * *